(12) United States Patent
Qian et al.

(10) Patent No.: US 11,724,805 B2
(45) Date of Patent: Aug. 15, 2023

(54) CONTROL METHOD, CONTROL DEVICE, AND CARRIER SYSTEM

(71) Applicant: SZ DJI TECHNOLOGY CO., LTD., Shenzhen (CN)

(72) Inventors: Jie Qian, Shenzhen (CN); Cong Zhao, Shenzhen (CN); Junfeng Yu, Shenzhen (CN); Xuyang Feng, Shenzhen (CN); Ang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 59 days.

(21) Appl. No.: 17/403,371

(22) Filed: Aug. 16, 2021

(65) Prior Publication Data
US 2021/0373578 A1   Dec. 2, 2021

Related U.S. Application Data

(63) Continuation of application No. 16/356,620, filed as application No. PCT/CN2016/100214 on Sep. 26, 2016, now Pat. No. 11,092,975.

(51) Int. Cl.
*B64C 39/02* (2023.01)
*G05D 1/00* (2006.01)
*G05D 1/02* (2020.01)
*G05D 1/10* (2006.01)
*G06F 18/00* (2023.01)
(Continued)

(52) U.S. Cl.
CPC .......... *B64C 39/024* (2013.01); *G05D 1/0094* (2013.01); *G05D 1/0253* (2013.01); *G05D 1/10* (2013.01); *G06F 18/00* (2023.01); *G06V 20/17* (2022.01); *B64U 2101/30* (2023.01); *G05D 1/0808* (2013.01); *G05D 1/101* (2013.01); *G06T 7/00* (2013.01); *G06V 40/161* (2022.01)

(58) Field of Classification Search
CPC .. G05D 1/0094; G05D 1/0253; G05D 1/0808; G05D 1/10; G05D 1/101; B64C 39/024; B64C 2201/127; G06K 9/00; G06V 40/161; G06T 7/00
USPC .......................................................... 701/2
See application file for complete search history.

(56) References Cited

U.S. PATENT DOCUMENTS 7,907,750 B2   3/2011  Ariyur et al.
8,942,964 B2   1/2015  Mcwilliams, III et al.
(Continued)

FOREIGN PATENT DOCUMENTS

CA    2977945 A1 *  9/2016  ........... B64C 39/024
CN    101794527 A     8/2010
(Continued)

OTHER PUBLICATIONS

The World Intellectual Property Organization (WIPO) International Search Report for PCT/CN2016/100214 dated Jun. 19, 2017 6 Pages.

*Primary Examiner* — Atul Trivedi
(74) *Attorney, Agent, or Firm* — Anova Law Group, PLLC

(57) ABSTRACT

A control method includes acquiring motion information of a tracked object, and based on the motion information, controlling movement of a carrying device that carries a tracking device to enable the tracking device to track the tracked object while maintaining approximately unchanged an angle between a moving direction of the tracked object and a line connecting the tracked object and the tracking device when the tracked object moves.

19 Claims, 17 Drawing Sheets

(51) Int. Cl.
*G06V 20/17* (2022.01)
*G06T 7/00* (2017.01)
*G05D 1/08* (2006.01)
*G06V 40/16* (2022.01)
*B64U 101/30* (2023.01)

(56) References Cited

U.S. PATENT DOCUMENTS

| | | | |
|---|---|---|---|
| 9,056,676 B1 * | 6/2015 | Wang | B64F 1/222 |
| 9,164,506 B1 * | 10/2015 | Zang | G05D 1/12 |
| 9,221,506 B1 | 12/2015 | Georgeson et al. | |
| 10,386,188 B2 | 8/2019 | Tian et al. | |
| 10,599,138 B2 | 3/2020 | Bosworth | |
| 10,705,542 B1 | 7/2020 | Kimchi | |
| 2010/0042269 A1 * | 2/2010 | Kokkeby | G05D 1/0094 |
| | | | 701/3 |
| 2011/0301925 A1 | 12/2011 | Mcwilliams, III et al. | |
| 2013/0200207 A1 * | 8/2013 | Pongratz | B64C 39/024 |
| | | | 244/2 |
| 2014/0025230 A1 | 1/2014 | Levien et al. | |
| 2014/0334668 A1 * | 11/2014 | Saund | B64D 47/08 |
| | | | 382/103 |
| 2014/0336848 A1 * | 11/2014 | Saund | G06V 10/255 |
| | | | 701/3 |
| 2015/0226575 A1 * | 8/2015 | Rambo | G05D 1/0202 |
| | | | 701/523 |
| 2015/0268337 A1 | 9/2015 | Moe et al. | |
| 2016/0031559 A1 | 2/2016 | Zang | |
| 2016/0054737 A1 * | 2/2016 | Soil | H04N 23/695 |
| | | | 701/3 |
| 2016/0070261 A1 * | 3/2016 | Heilman | G08G 5/003 |
| | | | 701/2 |
| 2016/0070264 A1 * | 3/2016 | Hu | G05D 1/0011 |
| | | | 701/2 |
| 2016/0076892 A1 * | 3/2016 | Zhou | B64D 47/08 |
| | | | 701/3 |
| 2016/0086497 A1 | 3/2016 | Williams et al. | |
| 2016/0093124 A1 * | 3/2016 | Shi | G07C 5/085 |
| | | | 701/2 |
| 2016/0137311 A1 * | 5/2016 | Peverill | B64C 25/68 |
| | | | 701/16 |
| 2016/0202078 A1 | 7/2016 | Scalisi et al. | |
| 2016/0216072 A1 * | 7/2016 | McNeil | F41G 3/142 |
| 2016/0217698 A1 * | 7/2016 | Liu | B64C 39/024 |
| 2016/0273921 A1 * | 9/2016 | Zhou | G01C 21/165 |
| 2016/0275801 A1 | 9/2016 | Kopardekar | |
| 2016/0306351 A1 * | 10/2016 | Fisher | H04W 4/70 |
| 2016/0349746 A1 * | 12/2016 | Grau | G05D 1/0094 |
| 2017/0061813 A1 * | 3/2017 | Tao | G09B 9/08 |
| 2017/0178352 A1 | 6/2017 | Harmsen et al. | |
| 2018/0356635 A1 | 12/2018 | Haley | |
| 2020/0207474 A1 | 7/2020 | Foggia et al. | |
| 2020/0279494 A1 | 9/2020 | Tiana et al. | |
| 2020/0301426 A1 | 9/2020 | Bullock | |
| 2020/0385115 A1 | 12/2020 | Piasecki et al. | |
| 2020/0408923 A1 | 12/2020 | Hayes et al. | |
| 2022/0189316 A1 * | 6/2022 | Paul | G08G 5/0021 |
| 2022/0350330 A1 * | 11/2022 | Wang | G06F 3/017 |

FOREIGN PATENT DOCUMENTS

| | | |
|---|---|---|
| CN | 102043964 A | 5/2011 |
| CN | 102355574 A | 2/2012 |
| CN | 102419598 A | 4/2012 |
| CN | 102768518 A | 11/2012 |
| CN | 103149939 A | 6/2013 |
| CN | 103226357 A | 7/2013 |
| CN | 103472849 A | 12/2013 |
| CN | 103473757 A | 12/2013 |
| CN | 103838244 A | 6/2014 |
| CN | 103869773 A | 6/2014 |
| CN | 105204349 A | 12/2015 |
| CN | 105242684 A | 1/2016 |
| CN | 105527975 A | 4/2016 |
| CN | 105353774 U | 6/2016 |
| CN | 205353744 U | 6/2016 |
| CN | 105759839 A | 7/2016 |
| CN | 105847681 A | 8/2016 |
| CN | 205453893 U | 8/2016 |
| EP | 3276374 A1 | 1/2018 |
| GB | 2522327 A * | 7/2015 ........... G05D 1/0094 |
| WO | 2017222542 A1 | 12/2017 |

* cited by examiner

Direction of velocity

Direction of velocity

CONTROL METHOD, CONTROL DEVICE, AND CARRIER SYSTEM

CROSS-REFERENCE TO RELATED APPLICATIONS

This application is a continuation of application Ser. No. 16/356,620, filed on Mar. 18, 2019, which is a continuation application of International Application No. PCT/CN2016/100214, filed on Sep. 26, 2016, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of control technology and, more particularly, to a control method, control device, and carrier system.

BACKGROUND

With the development of information technology, people are paying more attention to developing technologies for automatic tracking of objects using tracking devices. Tracking technologies include, for example, methods for tracking moving objects using imaging devices, and methods for tracking hazardous moving objects (e.g., moving vehicles that are on fire) using rescue devices to take rescue actions.

Devices for carrying the tracking devices can include any suitable types of transportation vehicles and boats and ships, etc. With the advancement of flight technologies, aircrafts, such as unmanned aerial vehicle (UAV), or drones, can also be used for tracking objects.

Various emerging technical problems remain unaddressed relating to controlling the carrying devices that carry the tracking devices, such that the tracking devices can track the tracked objects.

SUMMARY

In accordance with the present disclosure, there is provided a control method. The control method includes determining a relative relationship between a tracked object and a tracking device. The control method also includes acquiring motion information of the tracked object. The control method further includes based on the motion information and the relative relationship, controlling movement of a carrying device that carries the tracking device to enable the tracking device to track the tracked object.

Also in accordance with the present disclosure, there is provided a control device. The control device includes a processor. The control device also includes a storage device configured to store instructions. The processor is configured to execute the instructions to perform a method including determining a relative relationship between a tracked object and a tracking device. The method also includes acquiring motion information of the tracked object. The method further includes based on the motion information and the relative relationship, controlling movement of a carrying device that carries the tracking device to enable the tracking device to track the tracked object.

Further in accordance with the present disclosure, there is provided a carrier system. The carrier system includes a carrying device configured to carry a tracking device. The carrier system also includes a control device. The control device includes a processor and a storage device configured to store instructions. The processor is configured to execute the instructions to perform a method including determining a relative relationship between a tracked object and the tracking device. The method also includes acquiring motion information of the tracked object. The method further includes based on the motion information and the relative relationship, controlling movement of the carrying device that carries the tracking device to enable the tracking device to track the tracked object.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
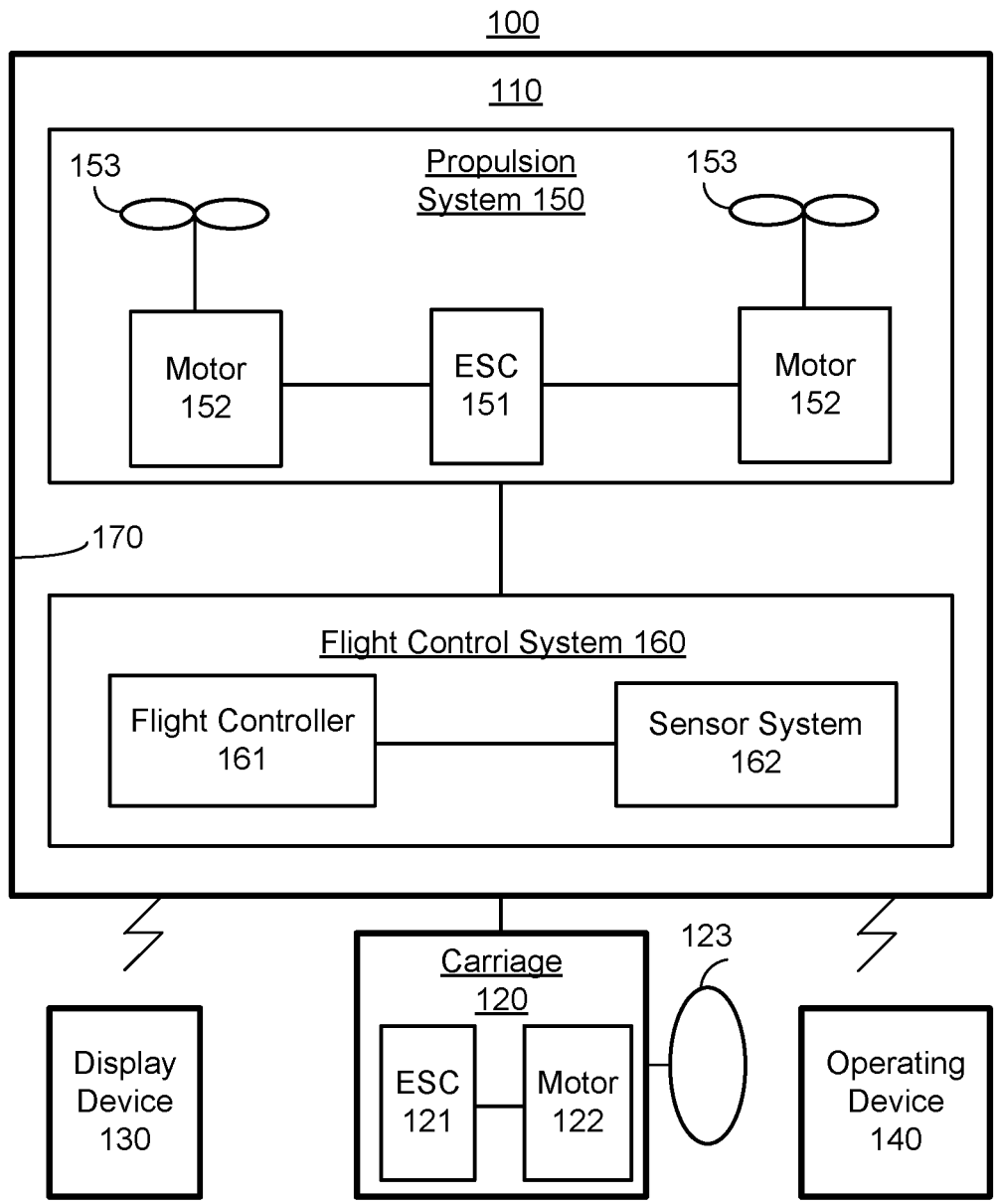
FIG. 1 is a schematic diagram of an unmanned flight system according to an example embodiment.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Example embodiments will be described with reference to the accompanying drawings, in which the same numbers refer to the same or similar elements unless otherwise specified.

As used herein, when a first component is referred to as "coupled to" a second component, it is intended that the first component may be directly coupled to the second component or may be indirectly coupled to the second component via another component. When a first component is referred to as "connecting" to a second component, it is intended that the first component may be directly connected to the second component or may be indirectly connected to the second component via a third component between them. The terms "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Embodiments of the present disclosure disclose a technical solution for tracking a tracked object using tracking devices. The tracking devices may include an imaging device, an epidemic prevention device, or a rescue device, depending on the applications. The tracking devices may be carried by a carrying device while tracking the tracked object.

Embodiments of the carrying devices may include aircrafts, water surface vehicles, under water vehicles, and ground vehicles, etc.

A carrying device may include a carriage for carrying a tracking device. The carriage may be installed on the aircrafts, water surface vehicles, under water vehicles, and ground vehicles, etc.

For example, in some embodiments, when the tracking device is an imaging device, the carrying device can be an aircraft. The aircraft may be installed with a mechanical gimbal for carrying the imaging device. Alternatively, the aircraft may not be installed with a mechanical gimbal. Rather, the field of view of the imaging device may be changed through an electrical gimbal.

For the convenience of understanding the present disclosure, the following descriptions use aircraft as an example of the carrying device when describing the disclosed embodiments. It should be understood that the carrying device is not limited to aircraft.

The following will introduce an example unmanned flight system. The disclosed embodiments may be implemented in various types of unmanned aerial vehicle (UAV). For example, the UAV may be a small-sized UAV. In some embodiments, the UAV may be a rotorcraft, such as a multi-rotor aircraft powered by multiple propulsion devices that provide air-driven propulsion. The disclosed embodiments are not limited to rotorcrafts. The UAV may be any other suitable types of UAV or movable devices.

FIG. 1 is a schematic diagram of an example unmanned flight system 100 according to an embodiment of the present disclosure. For illustrative purposes, the disclosed embodiment is described below using rotorcraft as an example.

Unmanned flight system 100 includes a UAV 110, a carriage 120, a display device 130, and an operating device 140. The UAV 110 includes a propulsion system 150, a flight control system 160, and a body frame 170. The UAV 110 communicates with the operating device 140 and the display device 130 through wired and/or wireless communication.

The body frame 170 may include a body and supporting legs (also called landing gears or landing support frames). The body may include a central frame and one or more arms mechanically coupled with the central frame. The one or more arms may radially extend from the central frame. The supporting legs are mechanically coupled with the body, and are configured to support the UAV during landing.

The propulsion system 150 includes an electrical speed control (or ESC) 151, one or more propellers 153, and one or more motors 152 corresponding to the one or more propellers 153. The one or more motors 152 are electrically coupled between the electrical speed control 151 and the one or more propellers 153. The one or more motors 152 and the one or more propellers 153 are positioned or mounted on corresponding arms. The electrical speed control 151 is configured or programmed to receive a driving signal from and generated by the flight control system 160. The electrical speed control 151 provides a driving current to the one or more motors 152 based on the driving signal received from the flight control system 160, thereby controlling a rotating speed of the one or more motors 152. Each motor 152 drives one or more propellers 153 to rotate, thereby providing propulsion for the flight of the UAV 110. The propulsion enables the UAV 110 to move in one or more degrees-of-freedom. In some embodiments, the UAV 110 may rotate around one or more axes. For example, the axes around which the UAV 110 may rotate may include a roll axis, a yaw axis, and a pitch axis. In some embodiments, each motor 152 may be a direct current (DC) motor or an alternating current (AC) motor. In some embodiments, each motor 152 may be a brushless motor or a brushed motor.

The flight control system 160 includes a flight controller 161 and a sensor system 162. The sensor system 162 acquires positioning information and attitude information of the UAV 110, such as the three-dimensional position, three-dimensional angle, three-dimensional velocity, three-dimensional acceleration, and three-dimensional angular velocity, etc. The sensor system 162 may include at least one of a gyroscope (gyro), an electronic compass, an inertial measurement units (IMU), a vision sensor, a global positioning system (GPS) device, or a barometer. The flight controller 161 is configured to control the flight of the UAV 110. The flight controller 161 may control the flight of the UAV 110 based on the attitude information measured by the sensor system 162. In some embodiments, the flight controller 161 may control the flight of the UAV 110 based on preset program commands. In some embodiments, the flight controller 161 may control the flight of the UAV 110 in response to or based on one or more command signals received from the operating device 140.

The carriage 120 includes an ESC 121 and a motor 122. The carriage 120 may also support a load 123. For example, when the carriage 120 is a gimbal, the load 123 may be an imaging device (such as a photo camera, a video camera, etc.). The present disclosure is not limited to such arrangements. For example, the carriage 120 may be used to support other types of load. The flight controller 161 can control the movement (or motion) of the carriage 120 through controlling the ESC 121 and the motor 122. In some embodiments, the carriage 120 may include one or more controllers configured to control the movement of the carriage 120 by controlling the ESC 121 and the motor 122. In some embodiments, the carriage 120 may be independent of the UAV 110, or may be an integral part of the UAV 110. The carriage 120 being independent of the UAV 110 means that the carriage 120 may be independently controlled, such as through a dedicated controller included in the carriage 120, rather than through a controller (e.g., the flight controller 161) included in other parts of the UAV 110. In some embodiments, the carriage 120 being independent from the UAV 110 may also indicate that the carriage 120 may be detachable from the UAV 110, and rather than being a fixed integral part of the UAV 110. In some embodiments, the motor 122 may be a DC motor or an AC motor. In some embodiments, the motor 122 may be a brushless motor or a brushed motor. The carriage 120 may be located at a top portion of the UAV 110. Alternatively, the carriage 120 may be located at a bottom portion of the UAV 110.

The display device 130 may be located at a ground terminal where the operator of the UAV 110 may be located. The display device 130 may communicate with the UAV 110 through wireless communication. The display device 130 may display attitude information of the UAV 110. When the load 123 includes an imaging device, the display device 130 may display videos and/or images captured by the imaging device. The display device 130 may be an independent device (e.g., independent of the operating device 140), or may be an integral part of the operating device 140.

The operating device 140 is located at the ground terminal where the operator of the UAV 110 may be located. The operating device 140 may communicate with the UAV 110 through wireless communication, and may control the UAV 110 remotely. The operating device 140 may be a remote control, or a terminal device installed with a software application for controlling the flight of the UAV 110, such as a smart phone, a tablet, a computer, etc. In some embodiments, the operating device 140 may receive information input by a user or operator for operating or controlling the UAV 110. A user may operate and control the UAV 110 through at least one of a wheel, a button, a key, or a joystick provided on a remote control, or through a user interface of a terminal device.

It should be understood that names of the various components of the unmanned flight system 100 are for the convenience of identification, and should not be construed as limiting the scope of the present disclosure.

Figure 2:
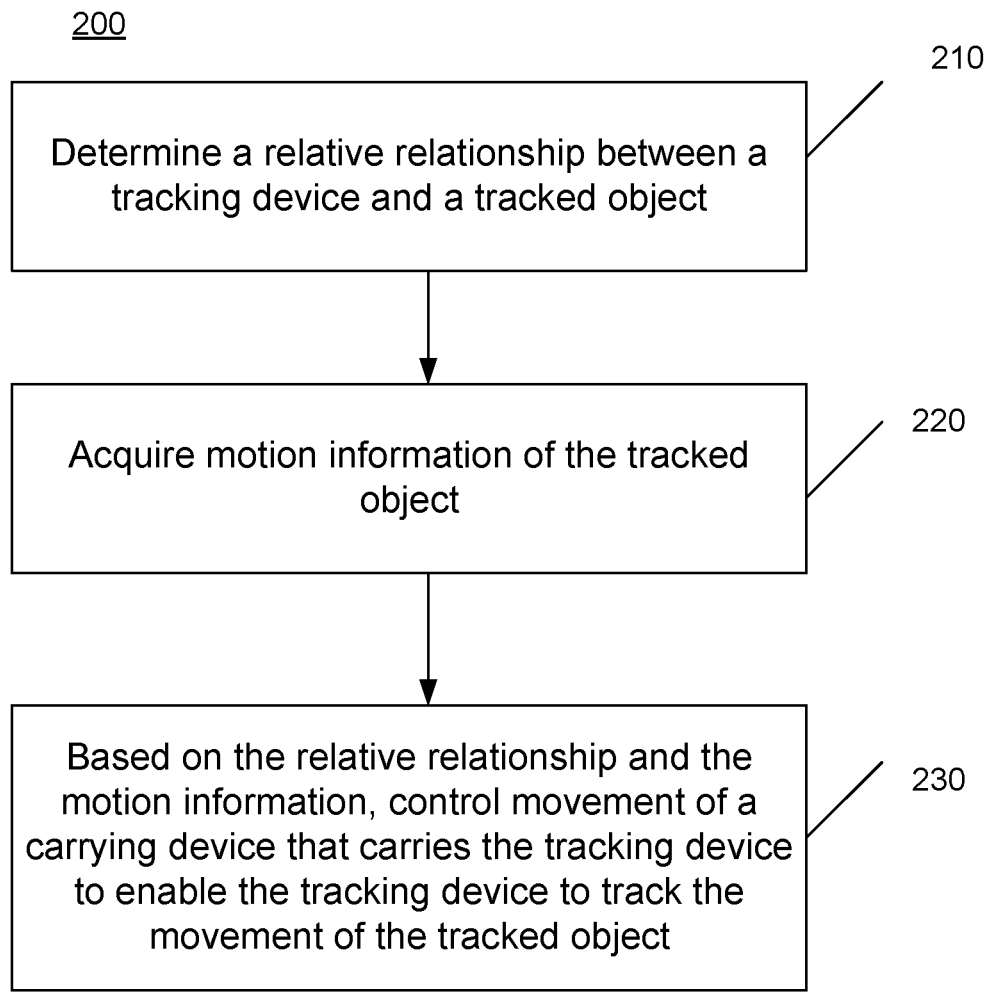
FIG. 2 is a flow chart illustrating a control method according to an example embodiment.

FIG. 2 is a schematic flow chart illustrating an example control method 200. In some embodiments, method 200 may be implemented in or by the unmanned flight system 100. For example, method 200 may be implemented by the flight controller 161 of the unmanned flight system 100. The flight controller 161 may be an embodiment of one or more control devices disclosed herein. An embodiment of one or more carrying devices disclosed herein may include at least one of the UAV 110 or the carriage 120. Method 200 may include steps 210-230 as shown in FIG. 2.

In step 210, the flight controller 161 determines a relative relationship between a tracking device and a tracked object. For example, the relative relationship may include at least one of the following: a relative position between the tracked object and the tracking device, a relative orientation (or direction) between the tracked object and the tracking device, a relative velocity between the tracked object and the tracking device, an angle between a line connecting the positions of the tracking device and the tracked object and a direction of a velocity of the tracked object, a relative acceleration between the tracked object and the tracking device, or a relative angular velocity between the tracked object and the tracking device.

In some embodiments, the relative position may indicate a relative distance between the tracked object and the tracking device and/or how the tracking device points to the tracked object.

For example, when the tracking device includes an image device, and the tracked object is a person, the relative orientation (or direction) may indicate which part of the person is being imaged by the imaging device, such as the front, rear, left side, or right side of the person.

In some embodiments, the relative orientation between the tracked object and the tracking device may refer to the orientation of the tracking device relative to the tracked object in the North East Down (NED) coordinate system. For example, the relative orientation may indicate that the tracking device is to the northwest of the tracked object, or to the west of the tracked object, etc.

In some embodiments, the position of the tracking device may be represented by the position of the carrying device. For example, the position of the imaging device may be represented by the position of the aircraft.

In some embodiments, the relative velocity between the tracked object and the tracking device may refer to the velocity of the tracking device relative to the tracked object. That is, the relative velocity between the tracked object and the tracking device may refer to the velocity at which the tracking device moves away from or toward the tracked object as if the tracked object is stationary.

In some embodiments, a velocity may include or refer to an amplitude of the velocity (e.g., speed) and/or a direction of the velocity.

For example, the relative velocity between the tracked object and the tracking device may refer to the amplitude of the relative velocity and/or the direction of the relative velocity.

In some embodiments, an angle between a line connecting the positions of the tracking device and the tracked object and a direction of a velocity of the tracked object may be defined as an angle formed by turning clockwise from the direction of the velocity of the tracked object. This definition may be used throughout the disclosed processes when the angle is used or computed. Alternatively, in some embodiments, the angle may be defined as an angle formed by turning counter-clockwise from the direction of the velocity of the tracked object, and this definition may be used throughout the disclosed processes when the angle is used or computed.

In some embodiments, when the velocity of the tracked object reverses the direction, the angle between a line connecting the positions of the tracking device and the tracked object and a direction of a velocity of the tracked object may become (180-a) degrees, where a is the angle between the line connecting the positions of the tracking device and the tracked object and the direction of the velocity of the tracked object before the direction of the velocity of the tracked object is reversed.

In some embodiments, the relative acceleration between the tracked object and the tracking device may refer to the acceleration of the tracking device relative to the tracked object. That is, the relative acceleration between the tracked object and the tracking device may refer to the acceleration of the tracking device moving away from or toward the tracked object as if the tracked object is stationary.

In some embodiments, the relative angular velocity between the tracked object and the tracking device may refer to an angular velocity of the tracking device relative to the tracked object. That is, the relative angular velocity between the tracked object and the tracking device may refer to the angular velocity of the tracking device rotating around the tracked object as if the tracked object is stationary.

In some embodiments, the relative relationship may be determined based on information input by a user. In some embodiments, the relative relationship may be determined based on information relating to the environment in which the UAV 110 is operated. In some embodiments, the relative relationship may be determined based on motion information of the tracked object.

Referring to FIG. 2, in step 220, the flight controller 161 acquires, detects, senses, or measures motion information of the tracked object.

For example, the motion information of the tracked object may include at least one of: a velocity of the tracked object, an acceleration of the tracked object, a change in orientation of the tracked object, or a change in attitude of the tracked object.

In some embodiments, the velocity of the tracked object may be determined based on differences in the positions of the tracked object at different time instances.

In some embodiments, the position of the tracked object may be determined based on satellite positioning information included in a signal received from the tracked object. Alternatively or additionally, the tracking device may acquire, obtain, or determine a relative position between the tracking device and the carrying device based on signals received from one or more sensors mounted on the carrying device. The flight controller 161 may determine the position of the tracked object based on satellite positioning information of the tracking device and the relative position. In some embodiments, the satellite positioning information may include global positioning system (GPS) positioning information. The one or more sensors mounted on the carrying device may include an imaging sensor, an infrared sensor, etc.

Figure 3:
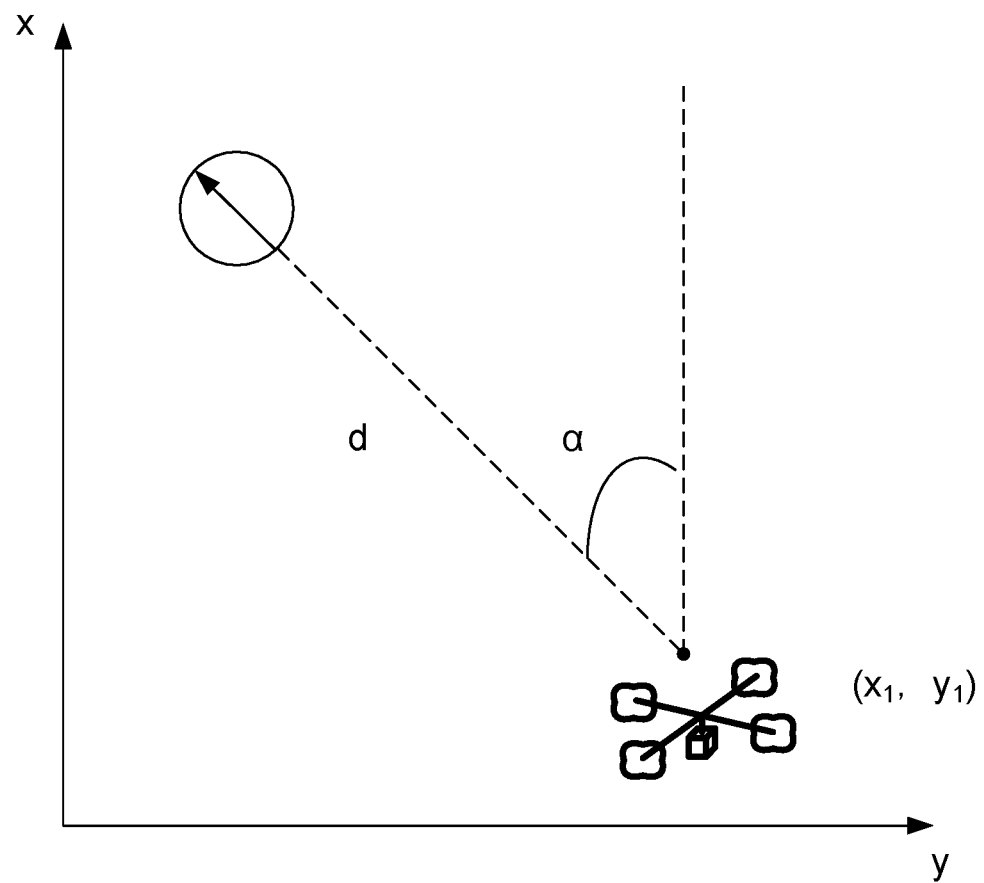
FIG. 3 schematically illustrates a relative relationship between a tracking device and a tracked object, according to an example embodiment.

FIG. 3 schematically illustrates a relative relationship between a tracking device and a tracked object. As shown in FIG. 3, let $\alpha$ represent the angle between the direction of velocity of the UAV 110 and a line connecting the positions of the UAV 110 and a tracked object (e.g., a person), d represent the distance between the UAV 110 and the tracked object, and $(x_1, y_1)$ represent coordinates of the UAV 110 in the x-y coordinate system shown in FIG. 3, then the position of the tracked object (e.g., a person) may be determined as $(x_0, y_0)$, where $x_0 = d \times \sin(\alpha) + x_1$, and $y_0 = d \times \cos(\alpha) + y_1$.

In some embodiments, after the velocity of the tracked object is computed, the acceleration of the tracked object may be determined, calculated, or computed based on a change in the velocity of the tracked object.

In some embodiments, a change in the orientation of the tracked object may refer to a change in the orientation of a person (when the person is a tracked object), or a change in the orientation of a vehicle (when the vehicle is a tracked object).

In some embodiments, a change in the attitude of the tracked object may refer to a change in any part of the tracked object, such as the standing, squat, hand gesture, and head shaking, etc., of a person when the person is the tracked object.

Referring to FIG. 2, in step 230, based on the relative relationship and the motion information, the flight controller 161 controls movement of a carrying device that carries the tracking device to enable the tracking device to track the movement of the tracked object.

In some embodiments, the carrying device may include an aircraft. To track the tracked object using the tracking device, the flight controller 161 may control at least one of an attitude of the aircraft or a flight path of the aircraft.

In some embodiments, the carrying device may include an aircraft and a carriage. To track the tracked object using the tracking device, the flight controller 161 may control at least one of an attitude of the aircraft, a flight path of the aircraft, or an attitude of the carriage.

In some embodiments, the attitude of the aircraft may be represented by at least one of the following angles of attitude: a yaw angle, a roll angle, or a pitch angle.

In some embodiments, the movement of the aircraft may be controlled by controlling the one or more angles of the attitude. For example, controlling the yaw angle may control the yaw motion (e.g., the deviation from a predetermined flight path) of the aircraft, controlling the roll angle may control the roll motion (e.g., the side motion) of the aircraft, and controlling the pitch angle may control the pitch motion (e.g., the forward and backward pitching motion) of the aircraft. In some embodiments, controlling one or more of the angles of attitude may include controlling the amplitude and/or direction of a change in the one or more angles of attitude.

In some embodiments, the carriage may include one or more rotating shaft mechanisms (or rotating axis mechanisms). The rotating shaft mechanisms may include at least one of a roll-axis mechanism including a structure rotating around a roll axis, a yaw-axis mechanism including a structure rotating around a yaw axis, or a pitch-axis mechanism including a structure rotating around a pitch axis. In some embodiments, controlling the attitude of the carriage may be realized by controlling the motion of the one or more rotating shaft mechanisms. For example, the flight controller 161 may control each structure included in the three types of rotating shaft mechanisms to rotate around the corresponding roll axis, yaw axis, or pitch axis. In some embodiments, the flight controller 161 may control the structure included in the roll-axis mechanism to rotate around the roll axis, the structure included in the yaw-axis mechanism to rotate around the yaw axis, and the structure included in the pitch-axis mechanism to rotate around the pitch axis.

In some embodiments, the method of controlling the attitude of the aircraft, the flight path of the aircraft, and the attitude of the carriage to enable the tracking device to track the tracked object may depend on the specific situations of the flight.

For example, when the amplitude of motion of the tracked object is relatively large, the flight controller 161 may adjust the flight path of the aircraft, and make fine adjustments to the attitude of the aircraft and/or the carriage such that the tracked object is within the field of view of the tracking device.

In some embodiments, when the amplitude of motion of the tracked object is relatively small, the flight controller 161 may not adjust the flight path of the aircraft. Instead, the flight controller 161 may adjust the attitude of the aircraft and/or the carriage such that the tracked object is within the field of view of the tracking device.

In some embodiments, the flight controller 161 may control the movement of the carrying device based on motion information of the tracked object, such that changes of the relative relationship between the tracking device and the tracked object are maintained within a predetermined range. The predetermined range may be the permissible range of errors.

In some embodiments, the flight controller 161 may control the movement of the carrying device based on the orientation of the tracked object.

To better understand the present disclosure, examples will be described with reference to FIGS. 4, 5a-5c, 6a-6c, and 7a-7c to explain how to control the movement of the carrying device to thereby enable the tracking device tracks the tracked object.

Figure 4:
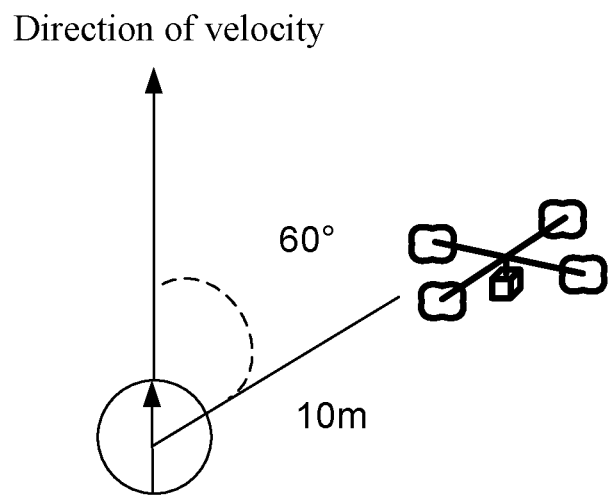
FIG. 4 schematically illustrates a relative relationship between a tracking device and a tracked object, according to another example embodiment.

In the example shown in FIG. 4, the tracked object is a person, and the tracking device includes an imaging device. The distance between the imaging device and the person is 10 meters (m). The arrow in the circle indicates a facing direction of the person. An imaging direction of the imaging device (e.g., a pointing direction of the imaging device) and the facing direction of the person forms a 60° angle. The direction of velocity of the person and the facing direction are in the same direction.

In some embodiments, when tracking the tracked object, the disclosed processes may take into account both the facing direction of the tracked object and the direction of movement of the tracked object. In some embodiments, the disclosed processes may take into account the direction of movement of the tracked object, but not the facing direction of the tracked object. In some embodiments, the disclosed processes may take into account the facing direction of the tracked object, but not the direction of movement of the tracked object.

Figure 5A:
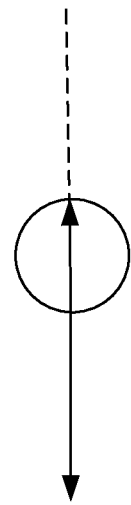
FIG. 5a is a schematic diagram illustrating motion information of a tracked object according to an example embodiment.

In the example shown in FIG. 5a, the facing direction of the person is assumed to be fixed. The direction of velocity of the movement of the person is reversed. The following descriptions explain how the position of the carrying device (which may be equivalent to or the same as the position of the tracking device) is determined with reference to different relative relationships.

Figure 5B:
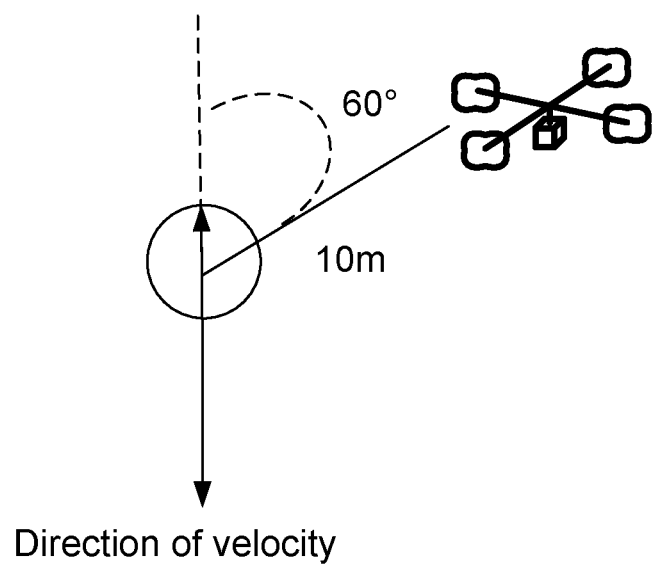
FIG. 5b schematically illustrates a relative relationship between a tracking device and a tracked object, according to another example embodiment.

For example, when what is tracked is the facing direction of the person, and the angle between the direction of velocity of the person and a line connecting the tracking device and the face of the person does not need to be maintained, then the position of the imaging device can be shown in FIG. 5b.

Figure 5C:
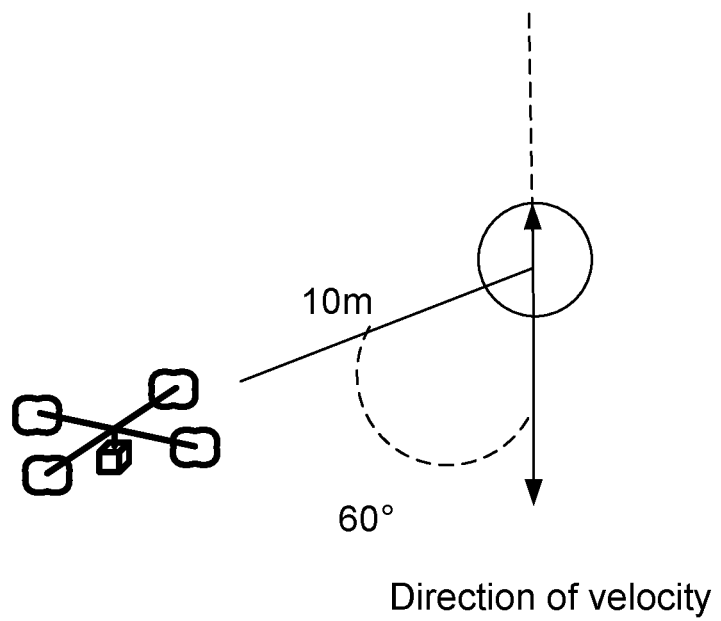
FIG. 5c schematically illustrates a relative relationship between a tracking device and a tracked object, according to another example embodiment.

In some embodiments, when the angle between the direction of velocity of the person and a line connecting the tracking device and the face of the person need be maintained, the position of the imaging device can be shown in FIG. 5c.

Figure 6A:
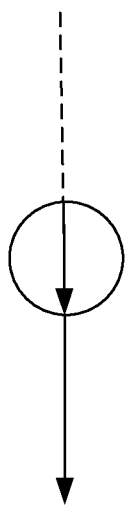
FIG. 6a is a schematic diagram illustrating motion information of a tracked object according to another example embodiment.
Figure 6B:
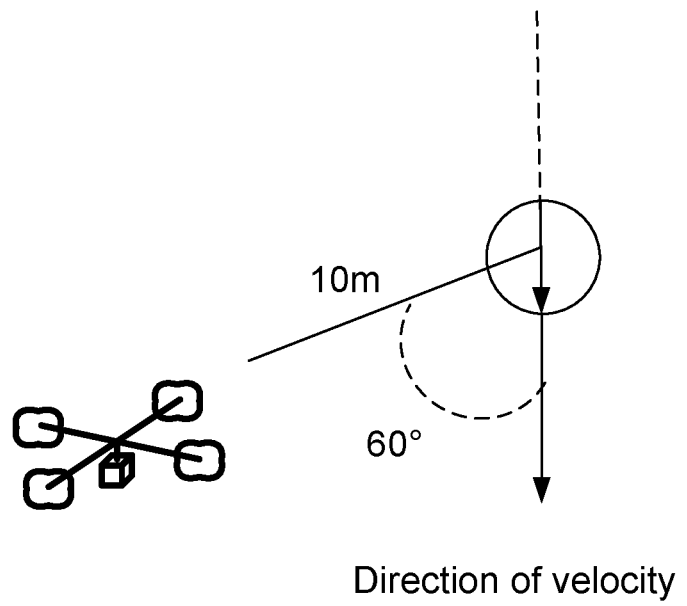
FIG. 6b schematically illustrates a relative relationship between a tracking device and a tracked object, according to another example embodiment.

When the facing direction of the person and the direction of velocity of the person are both reversed, as shown in FIG. 6a, when what is tracked is the facing direction of the person, or when the angle between the direction of velocity of the person and a line connecting the tracking device and the face of the person needs to be maintained, then the position of the imaging device can be shown in FIG. 6b.

Figure 7A:
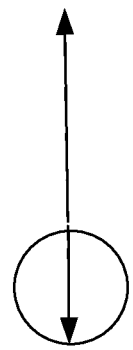
FIG. 7a is a schematic diagram illustrating motion information of a tracked object according to another example embodiment.

When the facing direction of the person changes over time, but the direction of velocity of the person does not change over time, this situation is illustrated in FIG. 7a. In this situation, the position of the carrying device with reference to different relative relationships will be explained.

Figure 7B:
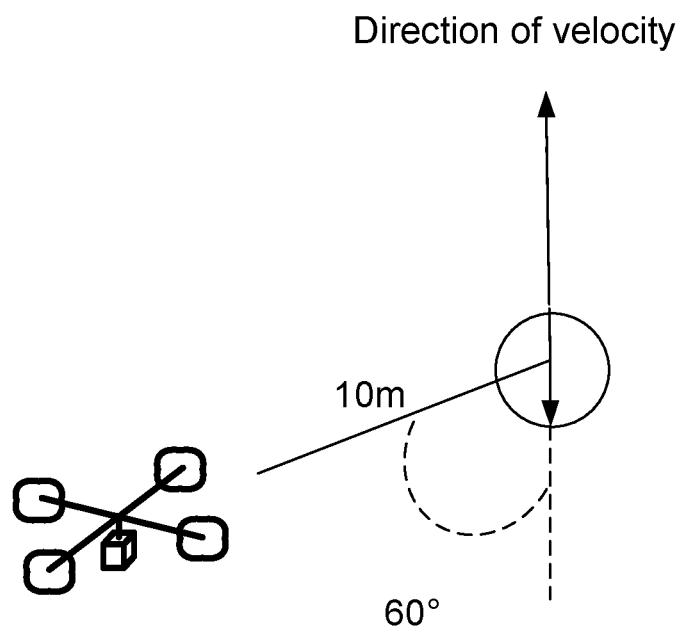
FIG. 7b schematically illustrates a relative relationship between a tracking device and a tracked object, according to another example embodiment.

For example, when the facing direction of the person is tracked, and when the angle between the line connecting the tracking device and the face of the person and the direction of velocity of the person does not need to be maintained, then the position of the imaging device can be shown in FIG. 7b.

Figure 7C:
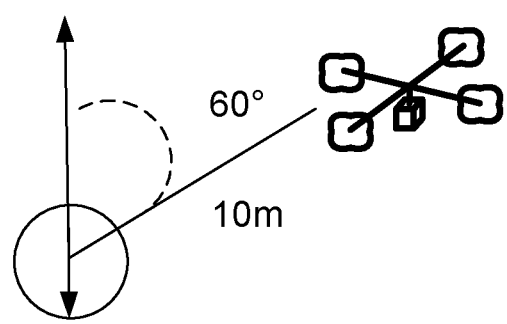
FIG. 7c schematically illustrates a relative relationship between a tracking device and a tracked object, according to another example embodiment.

For example, when the angle between the line connecting the tracking device and the face of the person and the direction of velocity of the person needs to be maintained, then the position of the imaging device can be shown in FIG. 7c.

The above descriptions explain how to track the facing direction of a face of a person, and how to maintain the angle between the line connecting the tracking device and the face of the person and the direction of velocity of the person. The disclosed embodiments are not limited to such descriptions. For example, in some embodiments, the tracking device may maintain the relative velocity, relative acceleration, and relative angular velocity with respect to the tracked object.

To better understand the disclosed embodiments, methods of calculating or determining a target direction (or target orientation) and a target position (or target location) of the tracking device will be described below. In some embodiments, the target direction of the tracking device may be the same as or equivalent to the target direction of the carrying device that carries the tracking device. The target position of the tracking device may be the same as or equivalent to the target position of the carrying device.

In some embodiments, the flight controller 161 may determine the target direction and the target position of the tracking device based on motion information of the tracked object, as well as the relative relationship. The flight controller 161 may control the movement of the carrying device to enable the tracking device (carried by the carrying device) to track the movement of the tracked object at the target position in the target direction. This embodiment may be referred to as a servo tracking mode, in which the direction of the tracking device may change based on the motion information of the tracked object and based on the relative relationship between the tracking device and tracked object.

In some embodiments, the flight controller 161 may determine a target angle as the angle between the line connecting the positions of the tracking device and the tracked object and the direction of velocity of the tracked object. In some embodiments, the flight controller 161 may determine a target direction of the tracking device based on the target angle and the direction of velocity of the tracked object.

In some embodiments, the target angle may be a predetermined angle.

In some embodiments, the predetermined angle may be any suitable angle, such as 90°.

In some embodiments, the flight controller 161 may determine a target position of the tracking device based on the relative position between the tracked object and the tracking device and the target angle.

Figure 8:
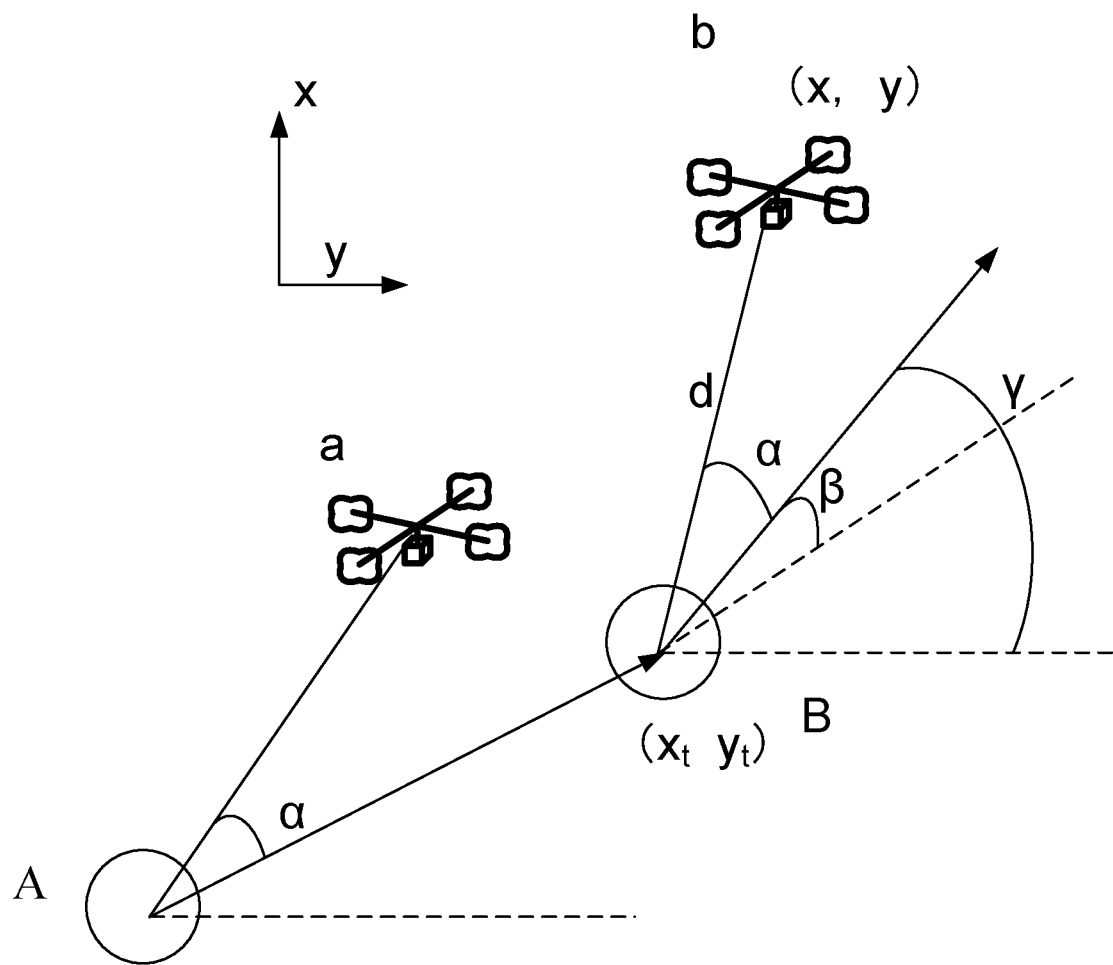
FIG. 8 schematically illustrates a relative relationship between a tracking device and a tracked object, according to another example embodiment.

FIG. 8 will be described below using an NED coordinate system. One of ordinary skill in the art would appreciate that the coordinate system of the present disclosure is not limited to the NED coordinate system. Any other coordinate system may be used. For example, the carrying device may be used as a reference.

As shown in FIG. 8, let angle α represent the angle between the line connecting the positions of the tracked object and the tracking device and the direction of velocity of the tracking device, distance d represent the distance between the tracked object and the tracking device, and assume from point A to point B, a change in the direction of the velocity of the tracked object is represented by β, then the direction of the tracking device also needs to change (e.g., rotate) an angle equal to β. At point B, let $(x_t, y_t)$ represent the coordinates of the tracked object, and assume the direction of velocity of the tracked object forms an angle γ with respect to the y-axis, then the target position (point b) of the tracking device may be determined as: $x=d \times \sin(\gamma+\alpha)+x_t$, and $y=d \times \cos(\gamma+\alpha)+y_t$.

It is understood that the angles shown in FIG. 8 are defined with reference to the y-axis. The present disclosure is not limited to this definition for the angles. For example, in some embodiments, the angles may be defined with reference to the x-axis. A person having ordinary skills in the art would appreciate that any variations of the above equations for determining coordinates (x, y) for the target position of the tracking device, which may be derived based on the disclosed equations without any inventive efforts, are within the scope of the present disclosure.

In some embodiments, every angle in the present disclosure may be defined to be positive or negative based on the clockwise or counter-clockwise direction. When addition or subtraction of the angles is to be performed, each angle may be defined to be positive or negative based on the clockwise direction, or the counter-clockwise direction.

It is understood that the direction (such as directions of velocity, etc.) mentioned in the present disclosure may be represented by an angle formed by the direction and the x-axis or y-axis of the NED coordinate system.

In some embodiments, the flight controller 161 may receive information input by a user when tracking a tracked object. Based on the information input by the user, motion information of the tracked object, and the relative relationship, the flight controller 161 may determine the target direction and the target position of the tracking device.

In some embodiments, the information input by the user may include an adjustment to the relative relationship and an adjustment to the relative position, or a method specified for tracking the tracked object (e.g., a tracking mode).

In some embodiments, the flight controller 161 may determine a target position for the tracking device based on a predetermined tracking direction for the tracking device, motion information of the tracked object, and the relative relationship. The flight controller 161 may control the movement of the carrying device based on the predetermined tracking direction and the target position to thereby enable the tracking device to track the tracked object at the target position in the predetermined tracking direction. This type of tracking mode may be referred to as fixed tracking, i.e., the predetermined tracking direction of the tracking device is fixed.

In some embodiments, the predetermined tracking direction of the tracking device forms a fixed angle with respect to a predetermined reference direction.

In the fixed tracking mode, a user or operator may preset the predetermined tracking direction of the tracking device. For example, the user may preset the predetermined tracking direction of the tracking device to be west. Regardless of how the movement of the tracking device changes, and regardless of what relationship is the relative relationship between the tracked object and the tracking device, the tracking direction of the tracking device does not change. When the tracking direction of the tracking device is fixed, the flight controller 161 may determine the target position of the tracking device based on the motion information of the tracked object and the relative relationship between the tracking device and the tracked object. It is understood that the tracking direction of the tracking device may refer to the pointing direction of the tracking device. For example, the tracking direction (or pointing direction) may be the imaging direction of an imaging device (when the imaging device is the tracking device), a spray direction of a fire extinguishing device (when the fire extinguishing device is the tracking device), etc.

Figure 9:
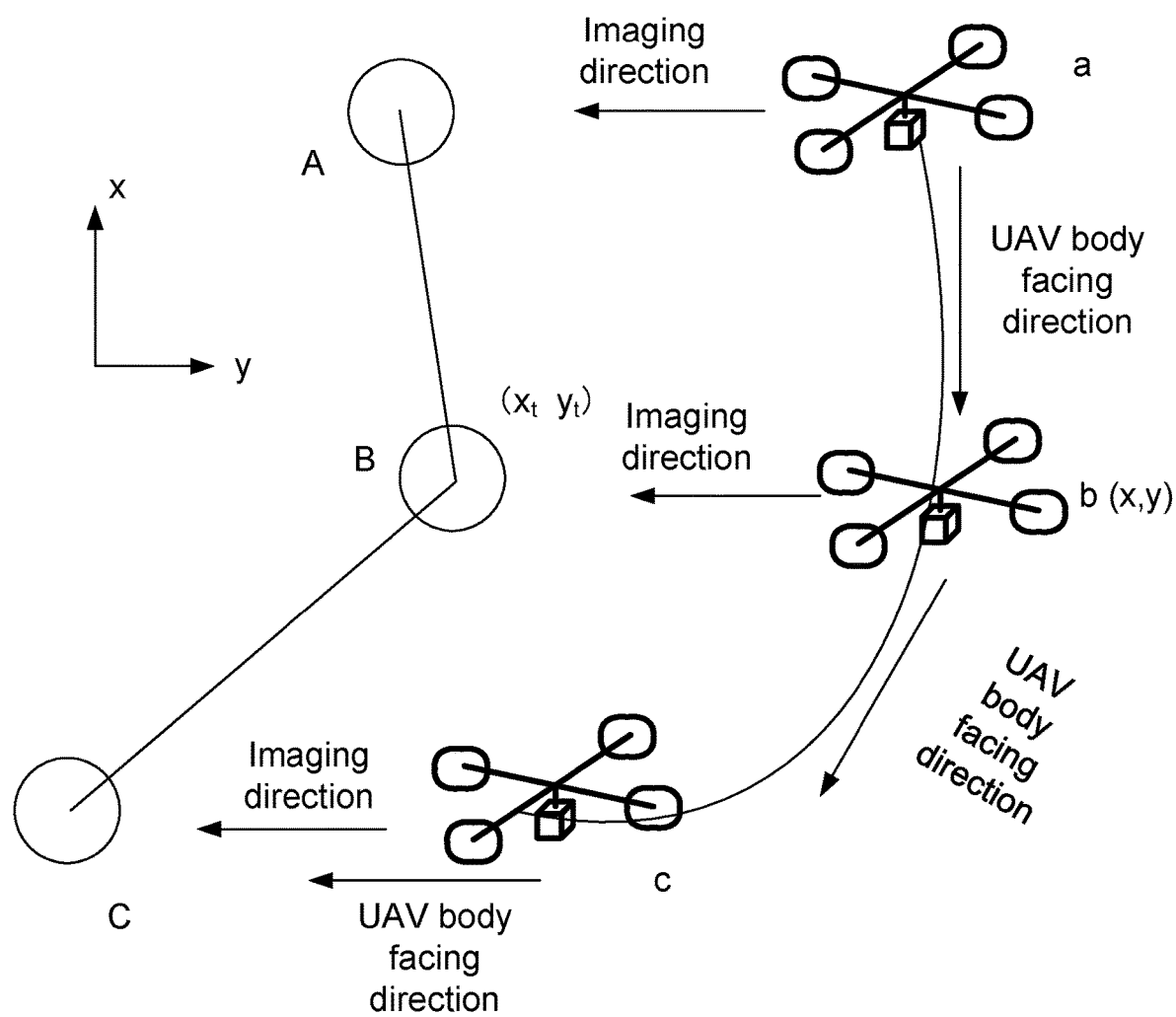
FIG. 9 schematically illustrates a relative relationship between a tracking device and a tracked object, according to another example embodiment.

FIG. 9 schematically illustrates a relative relationship between a tracking device and a tracked object. In FIG. 9, when the target object to be tracked (i.e., the tracked object) is at location (or position) A, the UAV 110 is at location "a" while imaging the target object. When the target object is at location B, the UAV 110 may be at location "b" while imaging the target object. When the UAV 110 is at location C, the UAV 110 may be at location "c" while imaging the target object. At locations "a," "b," and "c," the imaging direction of the tracking device is fixed in the west. The flight controller 161 may adjust the orientation the body of the UAV 110 and the position of the UAV 110, such that when the tracking device is facing west, the tracking device can capture videos and/or images of the target object, while maintaining the distance between the imaging device and the target object.

For example, when the target object is at location B, the coordinates of the target object are $(x_t, y_t)$. The target location that the imaging device need be located (i.e., location "b") can be expressed as (x, y), where $y=y_t+d$, $x=x_t$, where d is the distance to be maintained between the imaging device and the target object.

In some embodiments, after computing the target position (or location) of the tracking device, the flight controller 161 may determine the difference between the current location of the tracking device and the target location of the tracking device. Based on the difference, the flight controller 161 may determine a target velocity of the tracking device. The flight controller 161 may control the flight of the tracking device based on the target velocity of the tracking device.

In some embodiments, the flight controller 161 may acquire or receive information input by a user when the tracking device is tracking the tracked object. The flight controller 161 may determine the target position of the tracking device based on the information input by the user, the predetermined tracking direction of the tracking device, the motion information of the tracked object, and the relative relationship between the tracked object and the tracking device.

In some embodiments, the information input by the user may include an adjustment to the predetermined tracking direction of the tracking device, and/or a change to the relative relationship.

In some embodiments, the information input by the user may include a selection or specification of a tracking mode, such as, for example, the servo tracking mode or the fixed tracking mode.

In some embodiments, the tracked object may be a person, a body part of the person, an object or thing, or a part of the object or thing.

In some embodiments, as shown in FIG. 8, the tracked object may be the face of the person. The direction of velocity of the face of the person may be determined based on the velocity of movement of the person and a change in the facing direction of face of the person.

In some embodiments, the flying height of the aircraft may change as the ground level changes. In some embodiments, the flying height of the aircraft may change as the height (with reference to a ground level or a sea level) of the tracked object changes.

In some embodiments, the flight controller 161 may control the movement of the carrying device based on the type of the tracked object.

For example, based on the type of the of the tracked object, the flight controller 161 may determine corresponding constraints on the motion information of the tracked object. Based on the constraints, the flight controller 161 may filter noise included in the motion information of the tracked object. The flight controller 161 may use the filtered motion information of the tracked object to control the movement of the carrying device that carries the tracking device. In some embodiments, the flight controller 161 may filter the noise using a Kalman filter.

In some embodiments, the flight controller 161 may calculate the position of the tracked object. The flight controller 161 may calculate a difference in the positions of the tracked object at different time instances. The flight controller 161 may further calculate a velocity of the tracked object in the NED coordinate system based on the difference in the positions. In some embodiments, when a level of the noise in the calculated positions and velocity is large, the flight controller 161 may use the Kalman filter to filter the noise, thereby further refining the estimate of the velocity of the tracked object. When estimating the velocity of the tracked object, the flight controller 161 may assign a motion model to the tracked object based on a type of the tracked object categorized through a computer vision and/or image recognition algorithm. For example, if the vision and/or image recognition algorithm categorizes the tracked object as a person, then in the assigned motion model, the speed of the person (i.e., amplitude of the velocity of the person) may be limited to 10 m/s (meter/second) (i.e., a constraint on the velocity), the amplitude of the acceleration of the person may be limited to 5 m/s$^2$ (i.e., a constraint on the acceleration). If the vision and/or image recognition algorithm categorizes the tracked object as a vehicle, then in the assigned motion model, the speed of the vehicle may be limited to 40 m/s, and the acceleration of the vehicle may be limited to 25 m/s$^2$.

The present disclosure is not limited to using the Kalman filter to process (e.g., filter) the motion information of the tracked object. The flight controller 161 may use other suitable filters to process (e.g., filter) various signals and/or information of moving objects such as the tracked object.

In some embodiments, the flight controller 161 may determine a tracking mode based on a signal or information received from a user or operator.

For example, when the tracking mode specified by a user is to track a part of a tracked object at a constant distance, the flight controller 161 may determine that the information to be used for tracking the part of the tracked object can include the facing direction of the tracking device and the position of the tracking device. The flight controller 161 may also determine that the relative relationship to be used for tracking is the relative position between the tracked object and the tracking device.

In some embodiments, the flight controller 161 may determine the tracking mode based on the type of the tracked object.

For example, when the tracked object is a person, the tracking mode may include tracking the person based on a change of attitude of the person.

As another example, when the tracked object is a vehicle, the tracking mode may include adjusting the relative position between the tracking device and the vehicle based on a change in the velocity of the vehicle.

As a further example, when the tracked object is a ball, the tracking mode may include tracking the ball based on a direction of the velocity of the ball.

In some embodiments, the flight controller 161 may determine, based on the tracking mode, an information type of the motion information of the tracked object that may be used for tracking the tracked object. Based on the information type of the motion information, the flight controller 161 may determine whether such motion information of the tracked object is detected or acquired, or may acquire such motion information. Alternatively or additionally, based on the tracking mode, the flight controller 161 may determine a type of the relative relationship to be used for tracking the tracked object. Based on the type of the relative relationship, the flight controller 161 may determine the relative relationship to be used for tracking.

In some embodiments, the flight controller 161 may adjust the relative relationship between the tracked object and the tracking device based on a signal or information received from a user or operator.

In some embodiments, based on the signal or information received from the user, the flight controller 161 may adjust the relative relationship through adjusting the carrying device that carries the tracking device.

In some embodiments, the signal or information received from the user may include information relating to the attitude of the user. For example, the information relating to the attitude of the user may include a pointing direction of a hand gesture of the user. The flight controller 161 may adjust the relative relationship based on the pointing direction of the hand gesture. In some embodiments, based on the pointing direction of the hand gesture of the user, the flight controller 161 may adjust a moving direction (e.g., a direction of the velocity) of the tracking device. When the user cancels the pointing direction of the hand gesture, the flight controller 161 may stop adjusting the relative relationship. Based on the relative relationships before and after the adjustment, and based on the motion information of the tracked object, the flight controller 161 may adjust the movement of the carrying device to enable the tracking device to track the tracked object.

In some embodiments, the signal or information received from the user may be transmitted from the operating device 140.

For example, the user may operate the operating device 140 to send a signal through a pitch control element to the flight control system 160, such that the flight controller 161 may adjust the distance between the UAV 110 and the tracked object.

For example, the flight control system 160 may receive a signal transmitted from a roll control element of the operating device 140 operated by the user. The flight controller 161 may use the signal to control the UAV 110 to roll around the tracked object.

In some embodiments, after the flight control system 160 receives the signal transmitted from the roll control element of the operating device 140 operated by the user, the flight controller 161 may automatically detect or recognize that the signal received is to be used for controlling the UAV 110 to roll around the tracked object.

For example, in the servo tracking mode or the fixed tracking mode (also referred to as fixed parallel tracking mode), after the flight control system 160 receives the signal transmitted from the roll control element of the operating device 140 operated by the user, the flight controller 161 may automatically detect or recognize that the signal received is to be used for controlling the UAV 110 to roll around the tracked object.

In some embodiments, the flight control system 160 may receive a signal transmitted from a propulsion control element of the operating device 140 operated by the user. The flight controller 161 may adjust the flying height of the UAV 110 based on the received signal (e.g., by controlling the propulsion system 150).

In some embodiments, the pitch control element of the operating device 140 may be a pitch control stick or a pitch control button, the roll control element may be a roll control stick or a roll control button, and the propulsion control element may be a propulsion control stick or a propulsion control button, such as a throttle stick or button.

In some embodiments, based on signals received from the operating device 140 operated by the user, the control device (e.g., the flight controller 161) may adjust the movement of the carrying device with reference to the tracked object or a predetermined direction (which may correspond to a predetermined tracking direction of the tracking device), rather than with reference to a front end (e.g., head) of the carrying device. Such a control mode for adjusting the movement of the carrying device may be referred to as a headless mode. For example, if the flight controller 161 controls the carrying device to move forward based on signals received from the user (e.g., input by the user at the operating device 140), then the facing direction of the front end (e.g., head) of the carrying device may be based on the tracked object (e.g., the facing direction of the front end may point to the tracked object). The carrying device may move forward in a direction toward the tracked object (e.g., facing the tracked object) or in a predetermined direction (which may correspond to a predetermined tracking direction of the tracking device).

In some embodiments, the control device (e.g., the flight controller 161) may adjust the relative relationship between the tracking device and the tracked object based on information relating to an environment surrounding the UAV 110 or in which the UAV 110 is operated.

In some embodiments, the information relating to the environment in which the UAV 110 is operated includes weather information and/or geological position information, etc.

For example, when the sunlight is weak in the environment, the flight controller 161 may adjust the distance between the tracking device and the tracked object such that the tracking device approaches the tracked object.

As another example, when the UAV 110 encounters an obstacle, the flight controller 161 may determine a path to bypass or avoid the obstacle based on the positional relationship between the obstacle, the tracked object, and the tracking device. Based on the path to bypass the obstacle, the flight controller 161 may adjust the relative relationship between the tracked object and the tracking device.

In some embodiments, the path to bypass the obstacle may be based on approaching the tracked object to avoid the obstacle. With such a method avoids obstruction of the tracking device by the obstacle, such that the tracking device does not lose sight of the tracked object.

In some embodiments, the flight controller 161 may adjust the relative relationship based on the motion information of the tracked object.

For example, the flight controller 161 may adjust the relative distance and/or relative orientation (or direction) between the tracked object and the tracking device based on a velocity of the tracked object.

For example, in a 100-meter running match, the flight controller 161 may adjust the relative distance and/or relative orientation (or direction) between the imaging device (the tracking device) and an athlete (the tracked object) based on the velocity of the athlete. When the athlete is waiting for the starting signal, the speed of the athlete is 0. The flight controller 161 may fly the UAV 110 to a right front side of the athlete, such that the imaging device on the UAV 110 can take videos and/or images of the athlete from the right front side of the athlete. During the running period, the speed of the athlete is relatively fast. The flight controller 161 may fly the UAV 110 to the right side of the athlete such that the imaging device can take videos and/or images of the athlete from the right side of the athlete. Near the finishing line, the speed of the athlete may be reduced. The flight controller 161 may fly the UAV 110 to the front of the athlete, such that the imaging device can take videos and/or images of the facial expressions of the athlete.

In some embodiments, the flight controller 161 may adjust the relative distance and/or the relative orientation (or direction) between the tracked object and the tracking device based on an attitude (e.g., gesture, action) of the tracked object.

For example, when the UAV 110 is used to take videos and/or images of an entertainment program, and when a performer is singing, the flight controller 161 may fly the UAV 110 to become close to the performer such that the imaging device can take videos and/or images of the facial expressions of the performer. When the performer is dancing, the flight controller 161 may fly the UAV 110 to become distant from the performer such that the imaging device can take videos and/or images of the entire gestures and/or actions of the performer.

In some embodiments, the flight controller 161 may determine the relative relationship between the tracked object and the tracking device. The flight controller 161 may detect, acquire, or receive motion information of the tracked object. Based on the relative relationship and the motion information of the tracked object, the flight controller 161 may control the movement of the carrying device that carries the tracking device, such that the tracking device may track the tracked object in an automatic manner.

The above descriptions of FIGS. 2-9 explain the control methods of the present disclosure. In the following descriptions, a control device for implementing the control methods discussed above will be described with reference to FIGS. 10-11.

Figure 10:
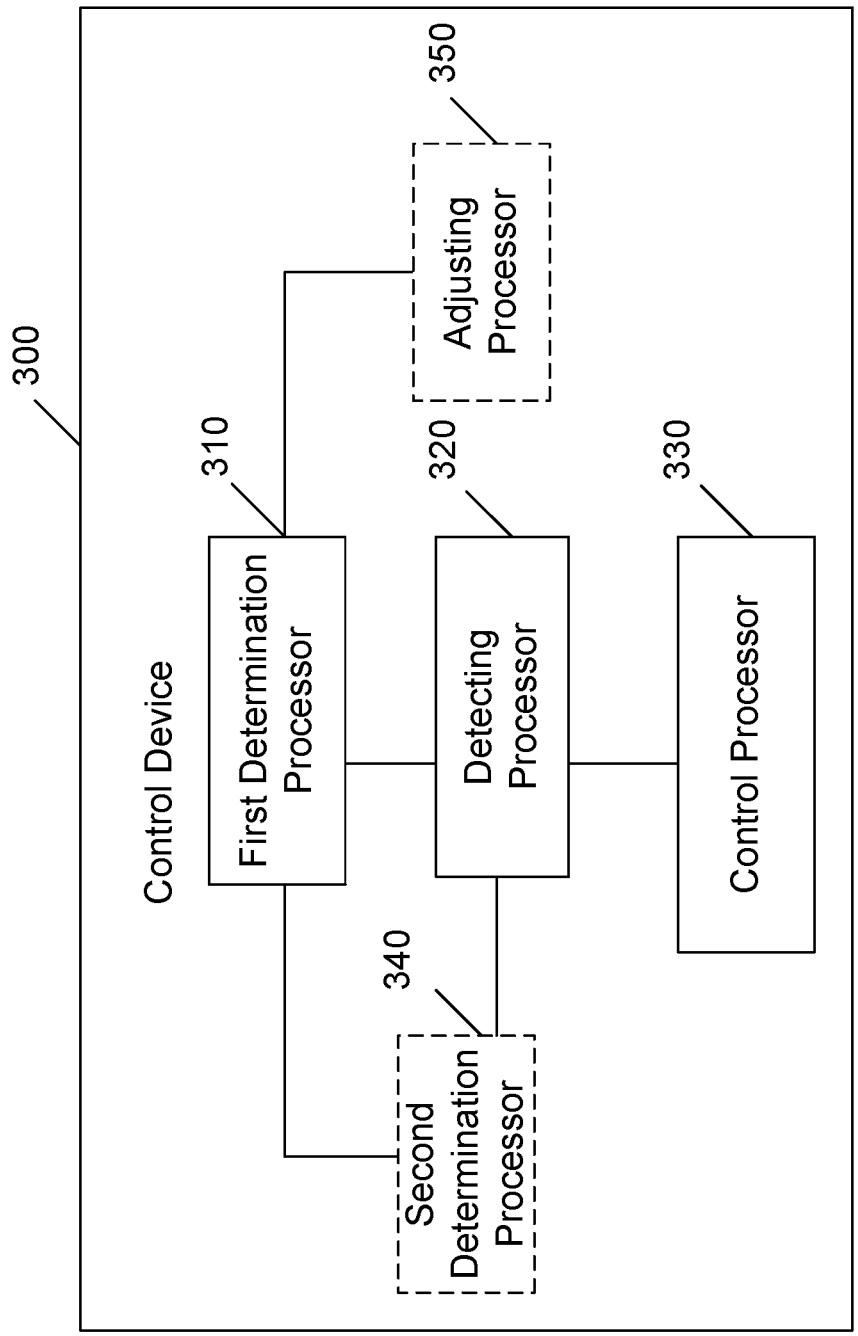
FIG. 10 is a schematic diagram of a control device according to an example embodiment.

FIG. 10 is schematic diagram of an example control device 300 according to the present disclosure. In some embodiments, the control device 300 may be an embodiment of the flight controller 161, or may be included in the flight controller 161. In some embodiments, the control device 300 may include the flight controller 161 or the flight controller 161 may be an embodiment of the control device 300. In some embodiments, the control device 300 may be part of the UAV 110, or may be independent of UAV 110 (e.g., being a standalone device separate from UAV 110). In some embodiments, the control device 300 may be part of the operating device 140. As shown in FIG. 10, the control device 300 includes a first determination processor 310 configured or programmed to determine the relative relationship between the tracked object and the tracking device. The control device 300 also includes a detecting processor 320 configured or programmed to detect or acquire motion information of the tracked object. The control device 300 also includes a control processor 330 configured or programmed to control the movement of the carrying device that carries the tracking device based on the motion information of the tracked object and the relative relationship, such that the tracking device may track the tracked object.

In some embodiments, the relative relationship includes at least one of the following relationships: a relative position (or location) between the tracked object and the tracking device, a relative orientation (or direction) between the tracked object and the tracking device, a relative velocity between the tracked object and the tracking device, an angle between a line connecting the positions of the tracked object and the tracking device and a direction of a velocity of the tracked object, a relative acceleration between the tracked object and the tracking device, or a relative angular velocity between the tracked object and the tracking device.

In some embodiments, the motion information of the tracked object includes at least one of the following: a velocity of the tracked object, an acceleration of the tracked object, a change in orientation of the tracked object, or a change in attitude (e.g., gesture) of the tracked object.

In some embodiments, the carrying device may include an aircraft. The control processor 330 may be configured or programmed to control at least one of the attitude of the aircraft or the flight path of the aircraft.

In some embodiments, the tracking device includes an imaging device.

In some embodiments, the carrying device includes a carriage disposed within the aircraft and configured to carry the imaging device.

In some embodiments, the control processor 330 may be configured or programmed to control at least one of the attitude of the aircraft, the flight path of the aircraft, or the attitude of the carriage.

In some embodiments, the control processor 330 may be further configured or programmed to control the movement of the carrying device based on motion information of the tracked object, thereby maintaining changes in the relative relationship between the tracking device and the tracked object within a predetermined range.

In some embodiments, the control processor 330 may be configured or programmed to determine a target orientation (or direction) and a target position (or location) of the tracking device based on the motion information of the tracked object and the relative relationship. The control processor 330 may control the movement of the carrying device to enable the tracking device to track the tracked object at the target position in the target orientation.

In some embodiments, the control processor 330 may be configured or programmed to determine or set a target angle as an angle between a line connecting the positions of the tracking device and the tracked object and the direction of the velocity of the tracked object.

In some embodiments, the control processor 330 may determine the target orientation of the tracking device based on the target angle and the direction of velocity of the tracked object.

In some embodiments, the control processor 330 may be configured or programmed to determine a target position of the tracking device based on the relative position between the tracked object and the tracking device and the target angle.

In some embodiments, the control processor 330 may determine the target position based on the following equations: $x = d \times \sin(\gamma+\alpha) + x_t$, $y = d \times \cos(\gamma+\alpha) + y_t$, where coordinates (x, y) represent the target position of the tracking device in the NED coordinate system. Coordinates $(x_t, y_t)$ represent the position of the tracked object in the NED coordinate system. Angle $\alpha$ represents the target angle, and angle $\gamma$ represents the angle between the direction of the velocity of the tracked object and a reference axis (e.g., the x-axis or the y-axis).

In some embodiments, the control processor 330 may be configured or programmed to determine a target position of the tracking device based on a predetermined tracking direction of the tracking device, the motion information of the tracked object, and the relative relationship.

In some embodiments, the control processor 330 may be configured or programmed to control the movement of the carrying device based on the predetermined tracking direction and the target position of the tracking device, thereby enabling the tracking device to track the tracked object at the target position in the predetermined tracking direction.

In some embodiments, the predetermined tracking direction of the tracking device forms a fixed angle with respect to a predetermined reference direction.

In some embodiments, the control processor 330 may be configured to acquire or receive information input by a user in the process of tracking the tracked object. The control processor 330 may be configured or programmed to determine the target position of the tracking device based on the information input by the user, the predetermined tracking direction of the tracking device, the motion information of the tracked object, and the relative relationship.

In some embodiments, the control processor 330 may be configured or programmed to control the movement of the carrying device based on a type of the tracked object.

In some embodiments, based on the type of the tracked object, the control processor 330 may be configured or programmed to determine corresponding constraints on the motion information of the tracked object.

In some embodiments, based on the constraints, the control processor 330 may filter noise included in the motion information of the tracked object. The control processor 330 may control, based on the filtered motion information of the tracked object, the movement of the carrying device that carries the tracking device.

In some embodiments, the control processor 330 may filter the noise using a Kalman filter.

In some embodiments, the second determination processor 340 may be configured or programmed to determine a tracking mode based on a signal received from a user. Alternatively or additionally, the second determination processor 340 may determine the tracking mode based on a type of the tracked object.

As shown in FIG. 10, the control device 300 may include the second determination processor 340. The second determination processor 340 may be configured or programmed to determine, based on the tracking mode, an information type of the motion information of the tracked object, which may be used to track the tracked object. The second determination processor 340 may be configured or programmed to determine detection of the motion information of the tracked object based on the information type, or to detect, acquire, or receive the motion information based on the information type.

In some embodiments, based on the tracking mode, the control device 300 may determine a type of the relative relationship to be used to track the tracked object. The control device 300 may determine the relative relationship based on the type of the relative relationship.

In some embodiments, the control device 300 includes an adjusting processor 350.

In some embodiments, the adjusting processor 350 may be configured or programmed to adjust the relative relationship based on a signal received from the user.

In some embodiments, the adjusting processor 350 may be configured or programmed to update, based on the signal received from the user, the relative relationship by adjusting the movement of the carrying device.

In some embodiments, the signal received from the user may include at least one of a gesture signal of the user or a signal transmitted from the operating device 140 operated by the user.

In some embodiments, the adjusting processor 350 may be configured or programmed to receive a signal transmitted from a pitch control element included in the operating device 140 operated by the user. The adjusting processor 350 may adjust a distance between the aircraft (e.g., UAV 110) and the tracked object based on the signal transmitted from the pitch control element.

In some embodiments, the adjusting processor 350 may be configured or programmed to receive a signal transmitted from a roll control element included in the operating device 140 operated by the user. The adjusting processor 350 may control the aircraft to fly around the tracked object based on the signal transmitted from the roll control element.

In some embodiments, the adjusting processor 350 may receive a signal from the propulsion control element included in the operating device 140 operated by the user. The adjusting processor 350 may control the flying height of the aircraft based on the signal transmitted from the propulsion control element.

In some embodiments, the adjusting processor 350 may be configured or programmed to adjust the movement of the carrying device based on signals received from the operating device 140 operated by the user. The adjustment of the movement of the carrying device may be based on a reference that is either the tracked object or a predetermined direction (which may correspond to a predetermined tracking direction of the tracking device), rather than the front end (e.g., head) of the tracking device.

In some embodiments, as shown in FIG. 10, the control device 300 includes the adjusting processor 350. The adjusting processor 350 may be configured or programmed to adjust the relative relationship based on information relating to the environment in which the UAV 110 is operated.

In some embodiments, the adjusting processor 350 may be configured or programmed to determine a path to bypass or avoid an obstacle that may affect the movement of the carrying device or affect the tracking. Based the path to bypass or avoid the obstacle, the adjusting processor 350 may adjust the relative relationship.

In some embodiments, the path to avoid the obstacle may be determined based on approaching the tracked object so as to avoid the obstacle.

In some embodiments, the adjusting processor 350 may be configured to adjust the relative relationship based on motion information of the tracked object.

In some embodiments, the adjusting processor 350 may be configured to adjust the relative position between the tracked object and the tracking device based on the velocity of the tracked object.

In some embodiments, the adjusting processor 350 may be configured to determine the relative position between the tracking device and the tracked object based on satellite positioning information of the tracked object transmitted from the tracked object, and satellite positioning information of the tracking device.

In some embodiments, the adjusting processor 350 may be configured to detect or acquire the relative position based on signals received from a sensor mounted on the carrying device.

In some embodiments, the detecting processor 320 may be configured or programmed to determine a velocity of the tracked object based on differences between positions of the tracked object at different time instances.

In some embodiments, the control device 300 may implement the method 200 shown in FIG. 2. For simplicity of discussion, detailed implementation of the method 200 using the control device 300 can refer to the discussions of the method 200 above, which are not repeated.

Figure 11:
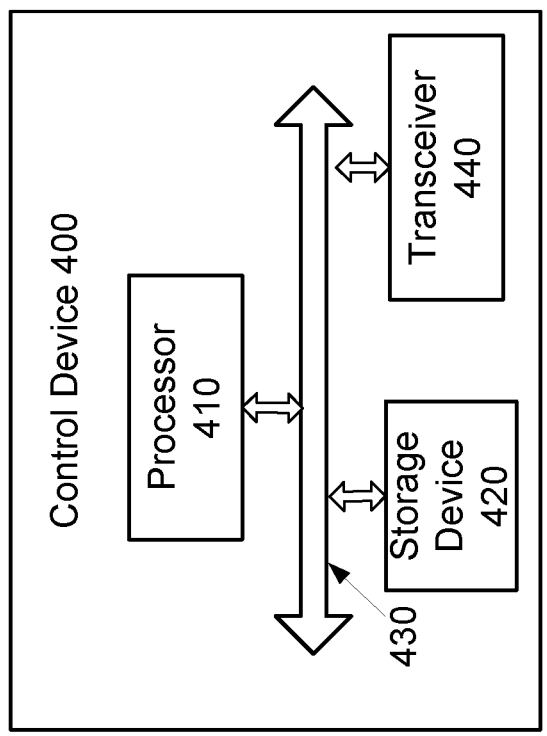
FIG. 11 is a schematic diagram of a control device according to another example embodiment.

FIG. 11 is a schematic diagram of an example control device 400, which may be an embodiment of the control device 300, the flight controller 161, or any other control device disclosed herein. In some embodiments, the control device 400 may be an embodiment of flight controller 161, or may be included in the flight controller 161. In some embodiments, the control device 400 may include the flight controller 161 or the flight controller 161 may be an embodiment the control device 400. In some embodiments, the control device 400 may be part of the UAV 110, or may be independent of UAV 110 (e.g., being a standalone device separate from UAV 110). In some embodiments, the control device 400 may be part of the operating device 140. As shown in FIG. 11, the control device 400 includes a processor 410 and a storage device 420. The control device 400 also includes a transceiver 440. The transceiver 440 may communicate with the operating device 140 shown in FIG. 1.

The processor 410 may read instructions stored in the storage device 420, and execute the instructions to perform one or more of the following processes: determining the relative relationship between the tracked object and the tracking device; detecting or acquiring motion information of the tracked object; and controlling the movement of the carrying device that carries the tracking device based on the motion information and the relative relationship, thereby enabling the tracking device to track the tracked object.

In some embodiments, the relative relationship includes at least one of the following: a relative position between the tracked object and the tracking device, a relative orientation (or direction) between the tracked object and the tracking device, a relative velocity between the tracked object and the tracking device, an angle between a line connecting the positions of the tracked object and the tracking device and a direction of the velocity of the tracked object, a relative acceleration between the tracked object and the tracking device, or a relative angular velocity between the tracked object and the tracking device.

In some embodiments, the motion information includes at least one of the following: a velocity of the tracked object, an acceleration of the tracked object, a change in the orientation of the tracked object, or a change in the attitude of the tracked object.

In some embodiments, the carrying device includes an aircraft.

In some embodiments, the processor 410 may execute the instructions stored in the storage device 420 to perform at least one of controlling the attitude of the aircraft or controlling a flight path of the aircraft.

In some embodiments, the tracking device includes an imaging device.

In some embodiments, the carrying device includes a carriage disposed in the aircraft and configured to carry the imaging device.

In some embodiments, the processor 410 may execute the instructions stored in the storage device 420 to perform at least one of controlling the attitude of the aircraft, controlling the flight path of the aircraft, or controlling the attitude of the carriage.

In some embodiments, the processor 410 may execute the instructions stored in the storage device 420 to control the movement of the carrying device based on the motion information of the tracked object, thereby maintaining the change in the relative relationship between the tracked object and the tracking device within a predetermined range.

In some embodiments, the processor 410 may execute the instructions stored in the storage device 420 to determine a target direction and a target position for the tracking device based on the motion information of the tracked object and the relative relationship. The processor 410 may control the movement of the carrying device to enable the tracking device to track the tracked object at the target position in the target direction.

In some embodiments, the processor 410 may execute the instructions stored in the storage device 420 to determine or set a target angle as the angle between a line connecting the positions of the tracking device and the tracked object and a direction of velocity of the tracked object. The processor 410 may determine the target direction of the tracking device based on the target angle and the direction of velocity of the tracked object.

In some embodiments, the processor 410 may execute the instructions stored in the storage device 420 to determine the target position of the tracking device based on the relative position between the tracked object and the tracking device and the target angle.

In some embodiments, the processor 410 may execute the instructions stored in the storage device 420 to determine the target direction and the target position of the tracking device based on an orientation (e.g., a facing direction) of the tracked object, the motion information of the tracked object, and the relative relationship.

In some embodiments, the processor 410 may execute the instructions stored in the storage device 420 to determine the target position of the tracking device based on the following equations: $x=d \times \sin(\gamma+\alpha)+x_t$, $y=d \times \cos(\gamma+\alpha)+y_t$, where coordinates (x, y) represent the target position of the tracking device in the NED coordinate system. Coordinates $(x_t, y_t)$ represent the position of the tracked object in the NED coordinate system. Angle $\alpha$ represents the target angle, and angle $\gamma$ represents the angle between the direction of the velocity of the tracked object and a reference axis (e.g., the x-axis or the y-axis).

In some embodiments, the processor 410 may execute the instructions stored in the storage device 420 to determine the target position of the tracking device based on a predetermined tracking direction of the tracking device, the motion information of the tracked object, and the relative relationship. The processor 410 may control the movement of the carrying device based on the predetermined tracking direction and the target position to enable the tracking device to track the tracked object at the target position in the predetermined tracking direction.

In some embodiments, the processor 410 may execute the instructions stored in the storage device 420 to receive or acquire information input by a user during a tracking process. The processor 410 may determine the target direction and the target position of the tracking device based on the information input by the user, the motion information of the tracked object, and the relative relationship.

In some embodiments, the predetermined tracking direction forms a fixed angle with respect to a predetermined reference direction.

In some embodiments, the processor 410 may execute the instructions stored in the storage device 420 to control the movement of the carrying device based on a type of the tracked object.

In some embodiments, the processor 410 may execute the instructions stored in the storage device 420 to determine, based on the type of the tracked object, constraints on the motion information of tracked object.

In some embodiments, based on the constraints, the processor 410 may filter noise included in the motion information of the tracked object, and control the movement of the carrying device that carries the tracking device based on the filtered motion information of the tracked object.

In some embodiments, the processor 410 may filter the noise using a Kalman filter.

In some embodiments, the processor 410 may execute the instructions stored in the storage device 420 to determine a tracking mode based on the type of the tracked object.

In some embodiments, the processor 410 may execute the instructions stored in the storage device 420 to acquire or receive signals transmitted from the user (e.g., from the operating device 140 operated by the user). The processor 410 may determine the tracking mode for tracking the tracked object based on the signals acquired or received from the user.

In some embodiments, the processor 410 may execute the instructions stored in the storage device 420 to determine, based on the tracking mode, an information type of the motion information to be used to track the tracked object. The processor 410 may determine detection of the motion information based on the information type, or may detect, receive, or acquire the motion information based on the information type.

In some embodiments, the processor 410 may determine, based on the tracking mode, a type of relative relationship to be used to track the tracked object, and determine the relative relationship based on the type of relative relationship.

In some embodiments, the processor 410 may execute the instructions stored in the storage device 420 to adjust the relative relationship based on a signal received from the user.

In some embodiments, the processor 410 may execute the instructions stored in the storage device 420 to adjust, based on the signal received from the user, movement of the carrying device and to update the relative relationship based on the adjustment of the movement of the carrying device.

In some embodiments, the signal received from the user may include at least one of a gesture signal of the user, or a signal transmitted from the operating device 140.

In some embodiments, the processor 410 may execute the instructions stored in the storage device 420 to receive a signal transmitted from a pitch control element included in the operating device 140 operated by the user. The processor 410 may adjust the distance between the aircraft and the tracked object based on the signal transmitted from the pitch control element.

In some embodiments, the processor 410 may execute the instructions stored in the storage device 420 to receive a signal transmitted from a roll control element included in the operating device 140. The processor 410 may control the aircraft to roll around the tracked object based on the signal transmitted from the roll control element.

In some embodiments, the processor 410 may execute the instructions stored in the storage device 420 to receive a signal transmitted from a propulsion control element included in the operating device 140. The processor 410 may adjust the fly height of the aircraft based on the signal transmitted from the propulsion control element.

In some embodiments, the processor 410 may execute the instructions stored in the storage device 420 to adjust, based on signals transmitted from the operating device 140 operated by the user, the movement of the carrying device with reference to the tracked object or with reference to a predetermined direction (which may correspond to a predetermined tracking direction of the tracking device), rather than with reference to a front end (e.g., head) of the carrying device.

In some embodiments, the processor 410 may execute the instructions stored in the storage device 420 to adjust the relative relationship based on information relating to the environment in which the aircraft is operated.

In some embodiments, when there is an obstacle that may affect the tracking or the movement of the carrying device in the environment, the processor 410 may execute the instructions stored in the storage device 420 to determine a path to bypass or avoid the obstacle based on the positional relationship between the obstacle, the tracked object, and the tracking device.

In some embodiments, the processor 410 may adjust the relative relationship based on the path to avoid the obstacle.

In some embodiments, the path to avoid the obstacle may be determined based on approaching the tracked object to avoid the obstacle.

In some embodiments, the processor 410 may execute the instructions stored in the storage device 420 to adjust the relative relationship based on the motion information of the tracked object.

In some embodiments, the processor 410 may execute the instructions stored in the storage device 420 to adjust the relative position between the tracked object and the tracking device based on a velocity of the tracked object.

In some embodiments, the processor 410 may execute the instructions stored in the storage device 420 to determine the relative position between the tracked object and the tracking device based on satellite positioning information of the tracked object transmitted from the tracked object, and satellite positioning information of the tracking device.

In some embodiments, the processor 410 may execute the instructions stored in the storage device 420 to determine the relative position using signals received from a sensor mounted on the carrying device.

In some embodiments, the processor 410 may execute the instructions stored in the storage device 420 to determine a velocity of the tracked object based on a difference in positions of the tracked object at different time instances.

In some embodiments, the control device 400 may implement the method 200 shown in FIG. 2. For simplicity of discussion, the detailed implementation of the method 200 using the control device 400 can refer to the discussions of the method 200.

Figure 12:
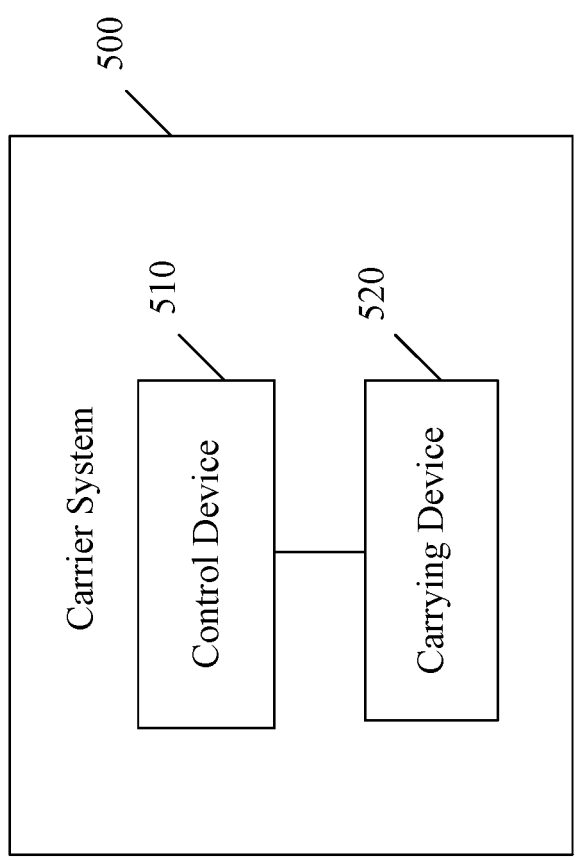
FIG. 12 is a schematic diagram of a carrier system according to another example embodiment.

FIG. 12 is a schematic diagram of an example carrier system 500. Carrier system 500 includes a control device 510 and a carrying device 520. The control device 510 may be an embodiment or part of control device 300, control device 400, or flight controller 161. In some embodiments, the flight controller 161, control device 300, or control device 400 may be an embodiment or part of control device 510. In some embodiments, the control device 510 may be part of the UAV 110, or may be independent of UAV 110 (e.g., being a standalone device separate from UAV 110). In some embodiments, the control device 510 may be part of the operating device 140. The carrying device 520 may include an aircraft, such as UAV 110.

In some embodiments, the carrying device 520 may include a carriage. In some embodiment, the carriage may include a gimbal.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, devices, and methods may be implemented in other manners not described herein. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located at one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physical unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the present disclosure, such as one of the example methods described herein. The storage medium can be any medium that can store program codes, for example, a USB disk, a mobile hard disk, a read-only memory (ROM), a random access memory (RAM), a magnetic disk, or an optical disk.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the disclosure being indicated by the following claims.

What is claimed is:

1. A control method, comprising:
acquiring motion information of a tracked object;
determining a relative relationship between the tracked object and a tracking device, wherein the relative relationship comprises at least an angle between a line connecting the tracked object and the tracking device and a direction of a velocity of the tracked object; and
based on the motion information and the relative relationship, controlling movement of a carrying device that carries the tracking device to enable the tracking device to track the tracked object while maintaining approximately unchanged the angle when the tracked object moves.

2. The control method of claim 1, wherein the motion information of the tracked object comprises at least one of: a velocity of the tracked object, an acceleration of the tracked object, a change in orientation of the tracked object, or a change in attitude of the tracked object.

3. The control method of claim 1,
wherein the carrying device comprises an aircraft, and
wherein controlling the movement of the carrying device that carries the tracking device comprises controlling at least one of an attitude of the aircraft or a flight path of the aircraft.

4. The control method of claim 3, wherein the tracking device comprises an imaging device.

5. The control method of claim 4,
wherein the carrying device comprises a carriage disposed in the aircraft and configured to carry the imaging device, and
wherein controlling the movement of the carrying device that carries the tracking device comprises controlling at least one of the attitude of the aircraft, the flight path of the aircraft, or an attitude of the carriage.

6. The control method of claim 1, wherein the relative relationship further comprises:
a relative position between the tracked object and the tracking device;
a relative orientation between the tracked object and the tracking device;
a relative velocity between the tracked object and the tracking device;
a relative acceleration between the tracked object and the tracking device; or
a relative angular velocity between the tracked object and the tracking device.

7. The control method of claim 1, wherein based on the motion information and the relative relationship, controlling the movement of the carrying device that carries the tracking device comprises:
determining a target direction and a target position for the tracking device based on the motion information of the tracked object and the relative relationship; and
controlling the movement of the carrying device to enable the tracking device to track the tracked object at the target position in the target direction.

8. The control method of claim 7, wherein determining the target direction and the target position for the tracking device based on the motion information of the tracked object and the relative relationship comprises:
determining the target direction and the target position of the tracking device based on an orientation of the tracked object, the motion information of the tracked object, and the relative relationship.

9. The control method of claim 7, wherein determining the target direction and the target position for the tracking device based on the motion information of the tracked object and the relative relationship comprises:
receiving information input by a user when tracking the tracked object; and
determining the target direction and the target position based on the information input by the user, the motion information of the tracked object, and the relative relationship.

10. The control method of claim 1, wherein based on the motion information and the relative relationship, controlling the movement of the carrying device that carries the tracking device comprises:
determining a target position of the tracking device based on a predetermined tracking direction of the tracking device, the motion information of the tracked object, and the relative relationship; and
controlling the movement of the carrying device based on the predetermined tracking direction and the target position to enable the tracking device to track the tracked object at the target position in the predetermined tracking direction.

11. The control method of claim 10, wherein the predetermined tracking direction forms a fixed angle with respect to a predetermined reference direction.

12. The control method of claim 10, wherein based on the motion information and the relative relationship, controlling the movement of the carrying device that carries the tracking device comprises:
receiving information input from a user when tracking the tracked object; and
determining a target position of the tracking device based on the information input from the user, the predetermined tracking direction of the tracking device, the motion information of the tracked object, and the relative relationship.

13. The control method of claim 1, further comprising:
receiving a signal from the user; and
determining a tracking mode for tracking the tracked object based on the signal from the user.

14. The control method of claim 1, further comprising:
determining a tracking mode for tracking the tracked object based on a type of the tracked object.

15. The control method of claim 14, further comprising:
based on the tracking mode, performing at least one of:
determining information type of the motion information of the tracked object to be used for tracking the tracked object and determining detection of the motion information based on the information type; or
determining a type of relative relationship to be used for tracking the tracked object and determining the relative relationship based on the type of relative relationship.

16. The control method of claim 1, wherein the angle is maintained at approximately 90° when the moving direction of the tracked object changes.

17. The control method of claim 1, further comprising:
controlling the movement of the carrying device based on the motion information of the tracked object to enable the tracking device to track the tracked object while maintaining approximately unchanged an orientation of the line connecting the tracked object and the tracking device when the tracked object moves.

18. A control device, comprising:
a processor; and
a storage device storing instructions;
wherein the processor is configured to execute the instructions to perform a method comprising:
acquiring motion information of a tracked object;

determining a relative relationship between the tracked object and a tracking device, wherein the relative relationship comprises at least an angle between a line connecting the tracked object and the tracking device and a direction of a velocity of the tracked object; and based on the motion information and the relative relationship, controlling movement of a carrying device that carries the tracking device to enable the tracking device to track the tracked object while maintaining approximately unchanged the angle when the tracked object moves.

19. A carrier system, comprising:

a carrying device configured to carry a tracking device; and a control device, comprising:

a processor; and a storage device storing instructions;

wherein the processor is configured to execute the instructions to perform a method comprising:

acquiring motion information of a tracked object;

determining a relative relationship between the tracked object and the tracking device, wherein the relative relationship comprises at least an angle between a line connecting the tracked object and the tracking device and a direction of a velocity of the tracked object; and based on the motion information and the relative relationship, controlling movement of the carrying device to enable the tracking device to track the tracked object while maintaining approximately unchanged the angle when the tracked object moves.

* * * * *